(12) United States Patent
Dandekar et al.

(10) Patent No.: US 8,858,907 B2
(45) Date of Patent: Oct. 14, 2014

(54) CATALYTIC REDUCTION OF NOX WITH HIGH ACTIVITY CATALYSTS WITH NH3 REDUCTANT

(71) Applicants: Ajit B. Dandekar, Falls Church, VA (US); Richard F. Socha, Yardley, PA (US); Richard L. Eckes, Madison, NJ (US); S. Beau Waldrup, Lumberton, TX (US); Jason M. McMullan, Bethlehem, PA (US)

(72) Inventors: Ajit B. Dandekar, Falls Church, VA (US); Richard F. Socha, Yardley, PA (US); Richard L. Eckes, Madison, NJ (US); S. Beau Waldrup, Lumberton, TX (US); Jason M. McMullan, Bethlehem, PA (US)

(73) Assignee: ExxonMobil Research and Engineering Company, Annandale, NJ (US)

(*) Notice: Subject to any disclaimer, the term of this patent is extended or adjusted under 35 U.S.C. 154(b) by 0 days.

(21) Appl. No.: 13/938,499

(22) Filed: Jul. 10, 2013

(65) Prior Publication Data
US 2014/0041364 A1 Feb. 13, 2014

Related U.S. Application Data

(60) Provisional application No. 61/681,268, filed on Aug. 9, 2012.

(51) Int. Cl.
B01D 53/56 (2006.01)
B01D 53/86 (2006.01)
(Continued)

(52) U.S. Cl.
CPC ............... *F01N 3/08* (2013.01); *B01J 29/7853* (2013.01); *B01D 2258/01* (2013.01);
(Continued)

(58) Field of Classification Search
USPC .......... 423/239.2; 422/168, 177, 180; 502/60, 502/64, 66, 71, 74, 77
See application file for complete search history.

(56) References Cited

U.S. PATENT DOCUMENTS 4,052,337 A * 10/1977 Nishikawa et al. ............. 502/60
4,210,628 A 7/1980 Ninomiya et al.
(Continued)

FOREIGN PATENT DOCUMENTS

EP 0077424 A1 4/1983
EP 0719580 A1 7/1996
(Continued)

OTHER PUBLICATIONS

PCT Search Report issued Oct. 22, 2013 in corresponding PCT Application No. PCT/US2013/051642 (4 pp).
(Continued)

*Primary Examiner* — Timothy Vanoy
(74) *Attorney, Agent, or Firm* — Glenn T. Barrett; Malcolm D. Keen

(57) ABSTRACT

Methods and systems for selective catalytic reduction of NOx with an ammonia reductant and a zeolite catalyst loaded with at least two metals selected from the group of tungsten, cobalt, and vanadium. An exhaust stream including NOx and a reductant stream including ammonia are provided to a catalytic reactor having the metal loaded zeolite catalyst at suitable operating temperatures for NOx reduction of at least 90%.

23 Claims, 3 Drawing Sheets

(51) Int. Cl.
- *B01J 29/00* (2006.01)
- *B01J 29/40* (2006.01)
- *B01J 29/70* (2006.01)
- *B01J 29/78* (2006.01)
- *F01N 3/08* (2006.01)
- *B01D 53/94* (2006.01)
- *B01J 29/16* (2006.01)
- *B01J 29/48* (2006.01)

(52) U.S. Cl.
CPC .............. *B01D 2251/206* (2013.01); *B01D 2255/20776* (2013.01); *B01J 29/78* (2013.01); *B01D 53/8628* (2013.01); *B01D 53/9418* (2013.01); *B01J 29/166* (2013.01); *B01D 2258/0283* (2013.01); *B01D 2255/20723* (2013.01); *B01J 29/48* (2013.01); *B01D 2255/20746* (2013.01); *B01J 29/7815* (2013.01); *B01D 2255/50* (2013.01)
USPC ........ 423/239.2; 422/168; 422/177; 422/180; 502/60; 502/64; 502/66; 502/71; 502/74; 502/77

(56) References Cited

U.S. PATENT DOCUMENTS

| | | | |
|---|---|---|---|
| 4,663,300 A * | 5/1987 | Lester et al. | 502/66 |
| 5,589,147 A | 12/1996 | Farnos et al. | |
| 6,541,408 B2 | 4/2003 | Chang et al. | |
| 7,011,801 B2 | 3/2006 | Van Den Brink et al. | |
| 7,163,668 B2 | 1/2007 | Bartley et al. | |
| 7,485,271 B2 | 2/2009 | Golunski et al. | |
| 7,743,602 B2 | 6/2010 | Kalyanaraman et al. | |
| 7,803,338 B2 | 9/2010 | Socha et al. | |
| 7,891,171 B2 | 2/2011 | Cho et al. | |
| 7,976,697 B2 | 7/2011 | Krishnamoorthy et al. | |
| 2005/0163691 A1 | 7/2005 | Kelkar et al. | |
| 2007/0092421 A1 | 4/2007 | Hancu et al. | |
| 2008/0167178 A1 | 7/2008 | Malyala et al. | |
| 2009/0081097 A1 | 3/2009 | Mochida et al. | |
| 2009/0263304 A1 * | 10/2009 | Yoshida et al. | 423/239.2 |
| 2009/0304566 A1 | 12/2009 | Golden et al. | |
| 2012/0058034 A1 * | 3/2012 | Ogunwumi et al. | 423/239.2 |
| 2013/0190166 A1 * | 7/2013 | Kato et al. | 502/78 |

FOREIGN PATENT DOCUMENTS

| | | | |
|---|---|---|---|
| EP | 2298434 A1 | 3/2011 | |
| EP | 2371450 A1 | 10/2011 | |
| JP | 63-130140 A * | 6/1988 | 423/239.2 |
| JP | 63-240951 A * | 10/1988 | 502/60 |
| JP | 6-198188 A * | 7/1994 | 423/239.2 |
| WO | 0174475 A1 | 10/2001 | |

OTHER PUBLICATIONS

PCT Written Opinion issued Oct. 22, 2013 in corresponding PCT Application No. PCT/US2013/051642 (5 pp).
PCT Search Report issued Oct. 22, 2013 in related PCT Application No. PCT/US2013/051638 (3 pp).
PCT Written Opinion issued Oct. 22, 2013 in related PCT Application No. PCT/US2013/051638 (3 pp).
PCT Search Report issued Oct. 22, 2013 in related PCT Application No. PCT/US2013/051648 (4 pp).
PCT Written Opinion issued Oct. 22, 2013 in related PCT Application No. PCT/US2013/051648 (4 pp).
Aksoylu et al., "Highly Dispersed Activated Carbon Supported Platinum Catalysts Prepared by OMCVD: A Comparison With Wet Impregnated Catalysts", Applied Catalysis A: General, vol. 243, pp. 357-365 (2003).

* cited by examiner

CATALYTIC REDUCTION OF NOX WITH HIGH ACTIVITY CATALYSTS WITH NH3 REDUCTANT

BACKGROUND

1. Field

The presently disclosed subject matter relates to methods and systems for removing pollutant gases from the exhaust gas stream formed by a combustion process, such as internal combustion engines, furnaces, power plants, and so forth. Particularly, the disclosed subject matter is related to the use of zeolite catalysts loaded with various of metals for selective catalytic reduction of nitrogen oxides (NOx) from the exhaust gases resulting directly or indirectly from a combustion process in the exploration, production, refining, manufacture, supply, transport, formulation or blending of petroleum, petrochemicals or the direct products thereof.

2. Description of Related Art

Combustion devices in commercial applications, such as those in the petroleum and petrochemical processing field, which includes the exploration, production, refining, manufacture, supply, transport, formulation or blending of petroleum, petrochemicals, or the direct products thereof, are a source of NOx emissions. A continuing effort has been made over the years to develop methods and systems to remove pollutant gases from exhaust gases produced by combustion unit operations.

Increasingly stringent environmental regulations have been enacted world-wide in an effort to reduce the emission of pollutant gases into the atmosphere from combustion equipment used by numerous unit operations within a commercial operation. Of particular interest is the production of nitrogen oxides (NOx).

Nitrogen oxides (NOx) are produced, for example, when nitrogen reacts with oxygen within a combustion chamber under high temperature and pressure conditions. NOx can also be produced, for example, in fluid catalytic converters (FCCs) and furnaces due to combustion of nitrogen from FCC feeds, heating oil, and/or fuel oil. Such nitrogen oxides can include either one or a combination of nitrogen monoxide and nitrogen dioxide.

Various selective catalytic reduction (SCR) methods have been developed in an effort to reduce NOx emissions. SCR is a catalytic technique to convert NOx to diatomic nitrogen, $N_2$, and water, $H_2O$. Typically, a fluid reductant—such as anhydrous ammonia, aqueous ammonia or urea—is added to a stream of exhaust gas and absorbed onto a catalyst.

However, such known techniques can be expensive to operate and/or may have limited capacity or efficiency. As such, there is a continued need for improved methods and apparatus for removing NOx from the exhaust gas stream of a combustion device, particularly those found in chemical processing and/or petrochemical refining operations.

SUMMARY OF THE INVENTION

In accordance with one aspect of the disclosed subject matter, a method for selective catalytic reduction of NOx includes providing an exhaust stream containing an amount of NOx from a combustion operation. At least a portion of the exhaust stream and a reductant stream including ammonia are introduced to a catalytic reactor that includes at least one zeolite catalyst loaded with at least two metals to reduce the amount of NOx in the exhaust stream. The two metals include a combination of at least two metals selected from the group consisting of tungsten, cobalt, and vanadium. The NOx-reduced exhaust stream is then directed from the catalytic reactor.

In one embodiment, the reductant stream can have a molar ratio of ammonia to the NOx in the exhaust stream of about 1:1. The collective GHSV of the reductant stream and the exhaust stream can be between about 30K cc per hour and about 120K cc per hour through the catalytic reactor. The exhaust stream can be provided from a refinery component, such as from a combustion furnace, a boiler, a heater turbine, or a fluid catalytic cracking unit among others. The catalyst contained in the catalytic reactor can be, for example, ZSM-5A loaded with about 6 wt. % vanadium and about 4 wt. % tungsten. Alternatively, the zeolite can be ZSM-57, USY, Beta, or MCM-41. The zeolite can also be loaded, for example, with about 6 wt. % cobalt and about 4 wt. % tungsten.

In accordance with another aspect of the disclosed subject matter, a system for selective catalytic reduction of NOx includes a conduit in fluid communication with a source of an exhaust stream containing NOx from a combustion operation and a source of a reductant stream including ammonia. The system includes a catalytic reactor in fluid communication with the conduit and the source of the reductant stream. The catalytic reactor includes at least one zeolite catalyst loaded with a combination of at least two metals selected from the group consisting of tungsten, cobalt, and vanadium. The catalytic reactor is configured to receive at least a portion of the exhaust stream and the reductant stream at suitable operating conditions to reduce the amount of NOx in the stream. The system also includes an outlet in fluid communication with the catalytic reactor to direct the NOx reduced exhaust stream from the catalytic reactor.

In one embodiment, the source of the exhaust stream can be a refinery component. The refinery component can be, for example, a combustion furnace, a boiler, a heater turbine, or a fluid catalytic cracking unit. The catalytic reactor can be located from the flue of the refinery component to maintain the operating temperature of the catalytic reactor between about 250° C. and about 400° C. In other embodiments, the system can include a heat exchanger operatively coupled to heat the exhaust stream to maintain the catalytic reactor at an operating temperature between about 250° C. and about 400° C. The catalyst contained in the catalytic reactor can be, for example, ZSM-5A loaded with about 6 wt. % vanadium and about 4 wt. % tungsten. Alternatively, the zeolite can be ZSM-57, USY, Beta, or MCM-41. The zeolite can also be loaded, for example, with about 6 wt. % cobalt and about 4 wt. % tungsten.

DETAILED DESCRIPTION

Figure 1:
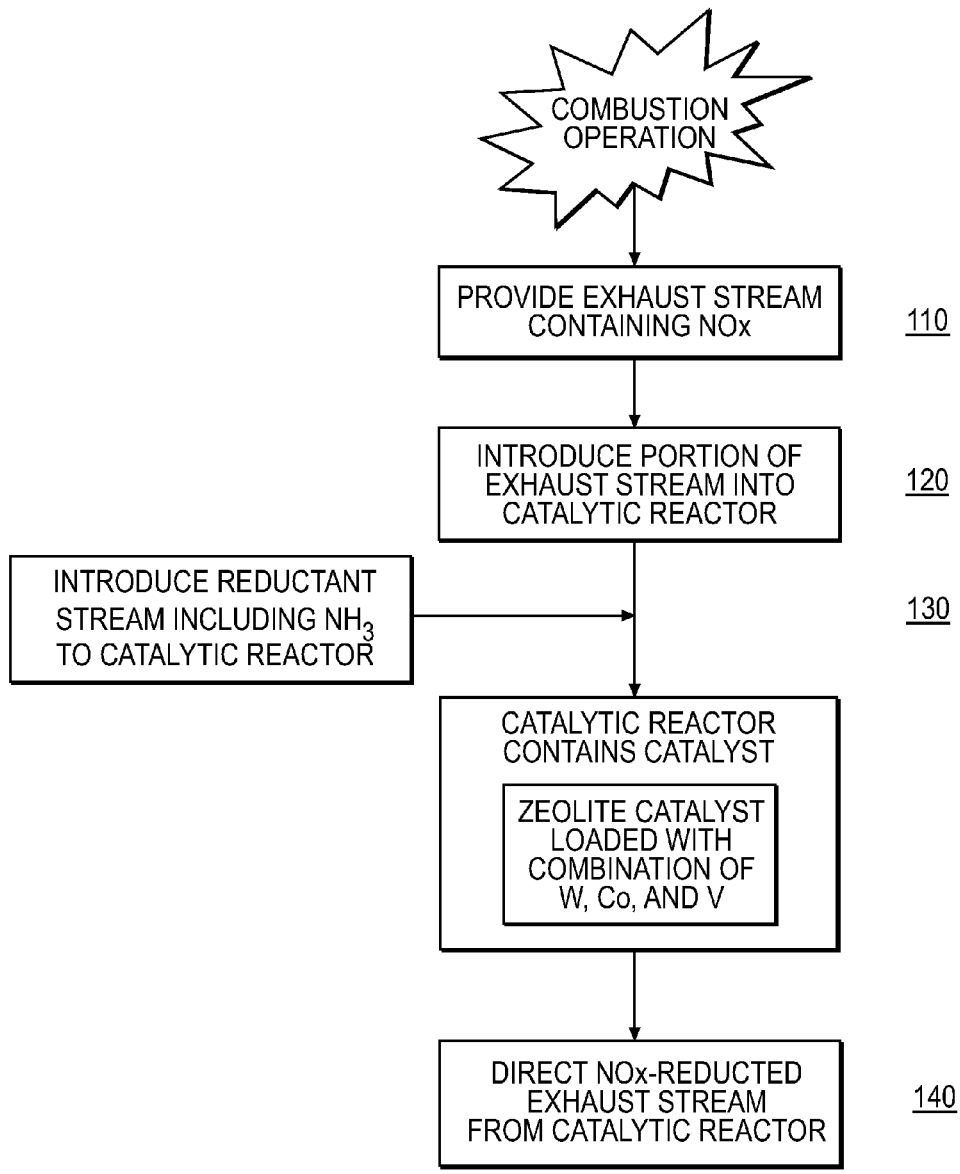
FIG. 1 is a flow diagram of a method for NOx reduction according to an embodiment of the disclosed subject matter.

As used herein, the term "NOx" refers generally to a compound consisting of nitrogen and at least one oxygen molecule, and particularly to one or more of nitrogen monoxide, nitrogen dioxide and di-nitrogen or nitrous oxide.

As used herein, the term "combustion operation" refers to any process wherein an energy-storing material is burned to produce energy or other byproduct. For example, a "combustion operation" can include a unit operation within a commercial operation or the like in which NOx is emitted as the result of a combustion reaction. A combustion operation can include, but is not limited to, the operation of a combustion engine, furnace, boiler, heater and a turbine. A combustion operation can further include a fluid catalytic converter ("FCC") regenerator operation, in which NOx is found in a FCC regenerator exhaust stream.

As used herein, the term "GHSV" refers to term "gaseous hourly space velocity" and is the ratio of the gaseous volumetric flow rate, at standard conditions of 60° F. and one atmosphere of pressure, to the catalyst volume.

As used herein, the term "commercial operation" refers to any operation in which a commodity (e.g., electricity), chemical, petroleum or other article of commercial interest (including a chemical intermediate to an article of commerce interest) is manufactured, produced or otherwise provided. The term "commercial operation" can include the exploration, production, refining, manufacture, supply, transport, formulation or blending of petroleum, petrochemicals, or the direct products thereof. As embodied herein, the article of commercial interest can be manufactured, produced or otherwise provided in an industrial scale.

As used herein, the term "provided in an industrial scale" refers to a scheme in which, for example, gasoline or other product of commercial interest is produced on a generally continuous basis (with the exception of necessary outages for plant maintenance or upgrades) over an extended period of time (e.g., over at least a week, or a month, or a year) with the expectation or object of generating revenues from the sale or distribution of the product of commercial interest, regardless of whether for profit or not for profit. Production in an industrial scale is distinguished from laboratory or pilot plant settings which are typically maintained only for the limited period of the experiment or investigation, and are conducted for research purposes and not with the expectation of generating revenue from the sale or distribution of the end product produced thereby.

The term "about" as used herein in reference to quantitative measurements refers to a value one of ordinary skill in the art would consider equivalent to the recited value (i.e., having the same function or result), or a value that can occur, for example, through typical measurement and process procedures.

Generally, selective catalytic reduction (SCR) is a process by which NOx can be reduced into diatomic nitrogen and water. For example, and not limitation, ammonia ($NH_3$) can be mixed into the exhaust stream in the catalytic reactor and act as a reducing agent (also known generally as a "reductant"). The NOx can react with ammonia in the presence of the catalyst to produce diatomic nitrogen and water. The NOx reduction efficiency can vary with a variety of parameters, including temperature, flow velocity of the exhaust stream, ratio of reductant to NOx, presence of other chemicals in the exhaust stream, and the like. One factor that impacts the reduction efficiency is the catalyst selected.

The presently disclosed subject matter is directed to selective catalytic reduction of NOx from the exhaust gases resulting from a combustion process in the refining of petroleum and petrochemicals with zeolite catalysts loaded with a combination of metals. The purpose and advantages of the present application will be set forth in and apparent from the description that follows. Additional advantages of the disclosed subject matter will be realized and attained by the methods, apparatus, and devices particularly pointed out in the written description and claims thereof, as well as from the appended drawings.

In accordance with one aspect of the disclosed subject matter, a method for selective catalytic reduction of NOx includes providing an exhaust stream containing an amount of NOx from a combustion operation. At least a portion of the exhaust stream and a reductant stream including ammonia are introduced to a catalytic reactor that includes at least one zeolite catalyst loaded with at least two metals to reduce the amount of NOx in the exhaust stream. The two metals include a combination of at least two metals selected from the group consisting of tungsten, cobalt, and vanadium. The NOx-reduced exhaust stream is then directed from the catalytic reactor.

In accordance with another aspect of the disclosed subject matter, a system for selective catalytic reduction of NOx includes a conduit in fluid communication with a source of an exhaust stream containing NOx from a combustion operation and a source of a reductant stream including ammonia. The system includes a catalytic reactor in fluid communication with the conduit and the source of the reductant stream. The catalytic reactor includes at least one zeolite catalyst loaded with a combination of at least two metals selected from the group consisting of tungsten, cobalt, and vanadium. The catalytic reactor is configured to receive at least a portion of the exhaust stream and the reductant stream at suitable operating conditions to reduce the amount of NOx in the stream. The system also includes an outlet in fluid communication with the catalytic reactor to direct the NOx reduced exhaust stream from the catalytic reactor.

Particular embodiments of the method and system are described below, with reference to FIG. 1 and FIG. 2, for purposes of illustration, and not limitation. For purposes of clarity, the method and the system are described concurrently and in conjunction with each other.

Figure 2:
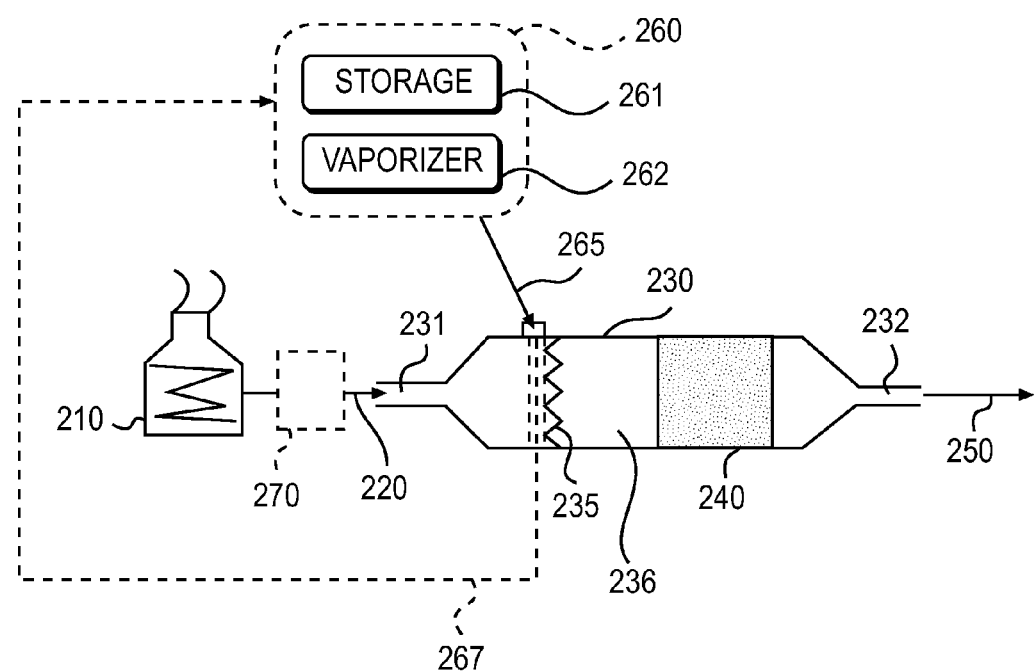
FIG. 2 is a schematic diagram of a system for NOx reduction according to an embodiment of the disclosed subject matter.
Figure 3:
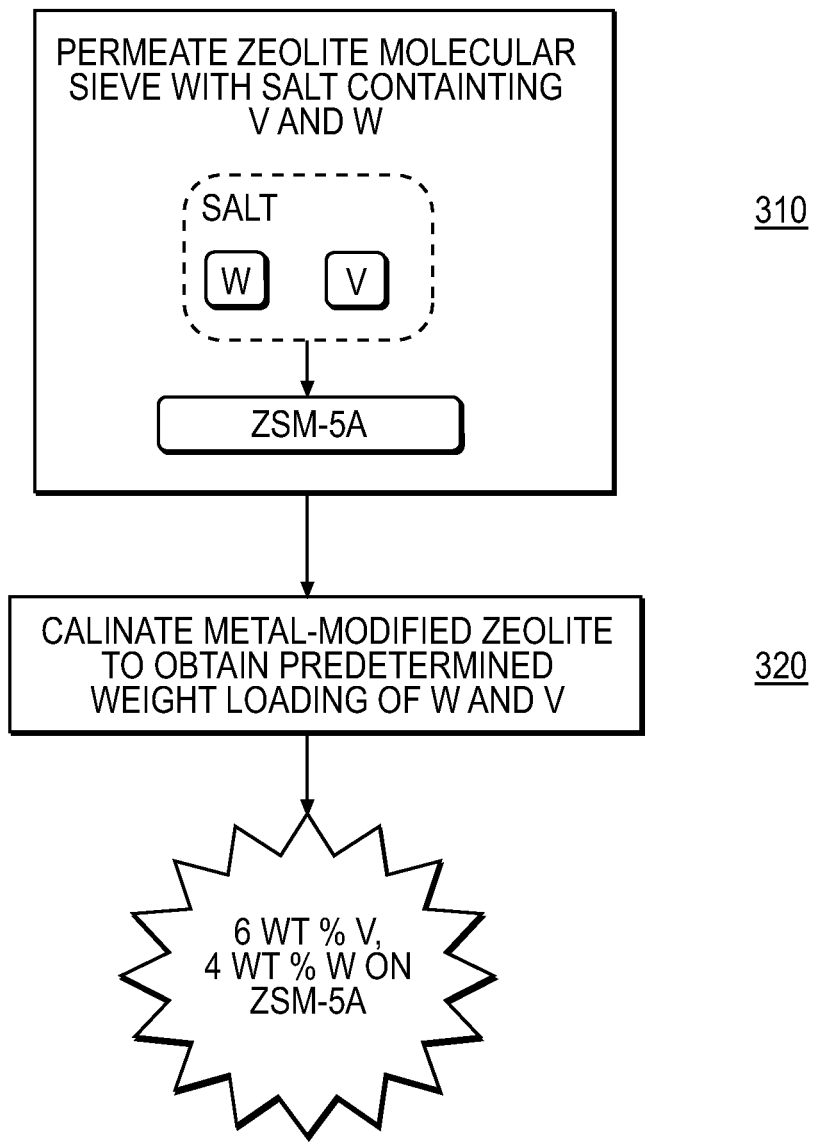
FIG. 3 is a flow diagram of a method for modifying a zeolite catalyst according to an embodiment of the disclosed subject matter.

In one embodiment, and with reference to FIG. 1 and FIG. 2, an exhaust stream 220 containing NOx is provided (step 110) from a combustion operation 210. The combustion operation 210 generally can include any combustion operation that produces an exhaust stream containing NOx. The combustion operation can be, for example, a combustion operation in a refining operation involving a refinery component. Such refinery component can include a combustion furnace, a boiler, a heater turbine, or a fluid catalytic cracking unit among others. The combustion operation generally has a flue or similar outlet, such that the exhaust stream 220 exists the combustion operation via the flue.

The exhaust stream 220 can include other gases in addition to NOx. For example, the exhaust stream can include an amount of oxygen, water, and other byproducts of the combustion operation. In the refinery setting, for example, the exhaust stream can contain trace amounts of hydrocarbons. Additionally, for example and not limitation, the exhaust stream can include up to about 20% oxygen and up to about 10% water, with no trace amount of hydrocarbons.

The exhaust stream 220 is introduced (step 120) to the catalytic reactor 230. For example, and as depicted in FIG. 2, the catalytic reactor 230 includes a vessel or similar structure of suitable construction for the intended operating conditions, and is in fluid communication with a conduit 231 extending from the source of the exhaust stream. The conduit 231 can be attached to the catalytic reactor by suitable means and provided with a suitable inlet adapter as needed for flow of the exhaust stream to an interior chamber 236 of the vessel of the catalytic reactor 230. For example, the conduit 231 can be threaded, welded, or otherwise attached to a port in the catalytic reactor 230. In one embodiment, the catalytic reactor 230 is located proximate a refinery flue of the at least one refinery component to maintain the catalytic reactor at an operating temperature between about 250° C. and about 400° C., as described further below. Alternatively, the exhaust stream 220 can first pass through one or more valves or treatment devices 270 prior to the catalytic reactor 230. For example, the exhaust stream can pass through a heat exchanger to control the temperature of the exhaust stream. Additionally or alternatively, a pump can be used to provide a desired flow rate to the catalytic reactor.

As previously noted, a reductant stream 265 also is introduced (step 130) to the interior chamber 236 of the catalytic reactor 230. The reductant stream 265 includes an effective amount of ammonia to reduce NOx. For example, the reductant stream can include only ammonia, or the reductant stream can include ammonia mixed with other gases such as air, oxygen, water vapor, or the like. In an exemplary embodiment, the amount of ammonia in the reductant stream 265 can be an amount sufficient to provide between 0.05 to 1.5 molar ratio of ammonia to the NOx in the exhaust stream 220. For example, if the amount of NOx in the exhaust stream 220 is between about 50 ppm and about 250 ppm, the amount of ammonia in the reductant stream 265 can be between about 125 ppm and about 375 ppm.

The reductant stream can be provided by a reductant stream source 260, such as a storage vessel 261 for storing ammonia. In some embodiments, the ammonia can be stored as a liquid. Where ammonia is stored as a liquid, the reductant stream source 260 can include a vaporizer 262 to convert the liquid ammonia to a gas. The vaporizer 262 can include, for example, a fan and an air heater. The reductant stream source 260 can also include one or more pumps and/or valves to control flow of the reductant stream. For example, a pump can be disposed in fluid communication with the storage vessel 261 and the vaporizer 262. A control valve can be located downstream from the pump. The control valve can be opened or closed, for example, by an actuator, and the pump can pump liquid ammonia to the vaporizer. The vaporizer 262 converts the liquid ammonia to a gas. The gas can then be fed into a mixer, and the mixer can provide the reductant stream 265 to the catalytic reactor 230.

The catalytic reactor 230 can have a port in fluid communication with the reductant stream source 260 to receive the reductant stream 265. The port can include a valve, or a plurality of valves to regulate the flow rate of the reductant stream. Additionally, the catalytic reactor 230 can have a spray nozzle, or series of spray nozzles 235, in fluid communication with the port, such that the reductant stream 265 can flow from the reductant stream source 260 through the port and through the spray nozzles 235 to the interior chamber 236 of the catalytic reactor. In the interior chamber 236 of the catalytic reactor, the reductant stream 265 can mix with the exhaust stream 220.

Additionally, the catalytic reactor 230 can have an outlet port to recycle excess ammonia back to the reductant stream source 260. In this manner, the flow from the outlet port 267 can pass through a system to regulate and process the recycled ammonia. Such systems are known in the art, and can include, among other things, one or more pump, valve, actuator, and/or or control unit.

As previously noted, and as embodied herein, the catalytic reactor 230 includes a catalyst of the disclosed subject matter, which includes at least one zeolite catalyst 240 loaded with at least two metals selected from the group consisting of tungsten, cobalt, and vanadium. The zeolite of the disclosed subject matter herein can be ZSM-5, ZSM-57, USY, MCM-41, or Beta. As used herein, the term "ZSM-5" can refer to various subtypes of the ZSM-5 zeolite, including ZSM-5A, ZSM-5B or ZSM-5C, each of which can be used as the zeolite catalyst in various embodiments. In an exemplary embodiment, ZSM-5A can be used as the zeolite. For purpose of illustration and example, the zeolite catalyst 240 can be loaded with, for example, about 6 wt. % vanadium and about 4 wt. % tungsten. Alternatively, the zeolite catalyst 240 can be loaded with about 6 wt. % cobalt and about 4 wt. % tungsten.

In accordance with the disclosed subject matter, the catalyst for use in selective catalytic reduction of NOx is further modified by permeating into a catalytic molecular sieve an amount of at least two metal salts, the metals being selected from the group consisting of cobalt, tungsten, and vanadium. The metal-modified catalyst is then calcinated in air to obtain a predetermined weight loading of the two metals loaded into the sieve.

The catalytic molecular sieve can be a zeolite. For example, the catalytic molecular sieve can be ZSM-5A, USY, Beta, ZSM-57, or MCM-41. The predetermined weight loading of vanadium, for example, can be about 6 wt. % and the predetermined loading of tungsten, for example, can be about 4 wt. %. Alternatively, the predetermined weight loading of cobalt, for example, can be about 6 wt. % and the predetermined weight loading of tungsten, for example, can be about 4 wt. %.

The supported metal catalyst can be fabricated using a conventional standard wet impregnation technique. Typically, catalyst supports (such as ZSM-5A) are impregnated with aqueous solutions containing dissolved metal containing salts (also known as metal precursors). This is followed by calcination in air at 1000° F. to decompose the precursor salt and obtain target weight loading.

Using the method as described above, the catalyst 240 can be structurally arranged, for example, on catalyst beds or the like within and interior chamber 236 of the catalytic reactor 230, and can be in the form of powders, pellets, particles, washcoated or formed monoliths such as a honeycomb structure, and the like to allow the exhaust stream to contact the catalyst 240 within the interior chamber 236 of the catalytic reactor 230.

In the presence of the catalyst disclosed herein, the flow of the exhaust stream 220 and the reductant stream 265 over the catalyst 240 reduces the NOx in the exhaust stream 220 into diatomic nitrogen and water. That is, and merely for purpose of explanation and not limitation, the reaction generally includes the following:

$$4NO + 4NH_3 + O_2 = 4N_2 + 6H_2O \qquad (1)$$

$$6NO + 4NH_3 = 5N_2 + 6H_2O \qquad (2)$$

$$2NO_2 + 4NH_3 + O_2 = 3N_2 + 6H_2O \qquad (3)$$

$$6NO_2 + 8NH_3 = 7N2 + 12H_2O \qquad (4)$$

$$NO + NO_2 + 2NH_3 = 2N2 + 3H_2O \qquad (5)$$

In addition to the selection and use of the catalyst, the amount of NOx reduction can be impacted by other operating conditions, one of which is temperature. With reference to the disclosed system, the operating temperature of the catalytic reactor can be, for example, between about 250° C. and 400° C. In one embodiment, the catalytic reactor 230 can be located at a position downstream from the flue outlet of the combustion operation 210 such that the exhaust stream 220 is between about 250° C. and 400° C. when the exhaust stream 220 reaches the catalytic reactor 230. For example, Combustion operations, such as in refinery equipment, often produce flue gas in the temperature range above 500° C. As the exhaust stream 220 flows through a conduit in fluid communication with the flue, the exhaust stream 220 loses thermal energy to the environment, and decreases in temperature. The catalytic reactor 230 can be located at a position downstream where the exhaust stream 220 is expected to be between about 250° C. and 400° C.

Alternatively, the operating temperature of the catalytic reactor can be maintained, for example, between about 250° C. and 400° C. with the use of a heat exchanger 270 or the like. The heat exchanger 270 can be located downstream from the exhaust flue source (i.e., the flue of the combustion operation 210) and upstream from the catalytic reactor 230. Various mechanisms and devices to control temperature of a flow gas are known. For example, an air heater or economizer can be disposed in the stream. Other suitable devices and techniques can also be suitable to maintain the operating temperature.

As demonstrated in the Examples below, the system and method disclosed herein can achieve NOx reduction of greater than 90%, and more preferably greater than 95%. The flow rate of the exhaust stream 220 through the catalytic reactor 230 therefore can be controlled or maintained at a desired level through the catalytic reactor 230 to utilize or maximize the capacity of the catalytic reactor. For example, flow regulators and/or pumps or the like, such as an induced-draft fan can be disposed in fluid communication with the system disclosed herein to maintain a desired flow rate through the catalytic reactor 230. With reference to the disclosed system and method, the GHSV can be, for example, between about 30K cc per hour and about 120K cc per hour. As embodied herein, GHSVs can be between about 30K cc per hour and about 120K cc per hour based on a catalyst provided in powder form. Likewise, the GHSV can be least 5000 cc per hour, for example, where the catalyst is provided on washcoated or bulk monoliths.

As noted above, the flow of the exhaust stream 220 over the catalyst 240 reduces the NOx in the exhaust stream 220 to diatomic nitrogen and water. After the NOx in the exhaust stream 220 is reduced to diatomic nitrogen and water, the NOx-reduced exhaust stream 250 is directed (step 140) from the catalytic reactor. For example, the NOx-reduced exhaust stream 250 can flow through an outlet conduit 232. The outlet conduit 232 can be in fluid communication with the downstream end of the catalytic reactor 230. The NOx-reduced exhaust stream can then be released into the atmosphere, for example through a stack.

EXAMPLE

The present application is further described by means of the examples, presented below. The use of such examples is illustrative only and in no way limits the scope and meaning of the invention or of any exemplified term. Likewise, this application is not limited to any particular preferred embodiments described herein. Indeed, many modifications and variations of the invention will be apparent to those skilled in the art upon reading this specification. The invention is to be understood by the terms of the appended claims along with the full scope of equivalents to which the claims are entitled.

In a first example, a gas mixture consisting of between about 50 ppm and 250 ppm of NO, about 2% $O_2$, and about 5% $H_2O$ is treated with a heterogeneous solid catalyst in a single stage SCR process with between about 50 and 250 ppm of $NH_3$ used as a reductant. The molar ratio of $NH_3$ to NO is about 1:1. The total flow rate is such that the GHSV ranged from 30K to 120K cc per hour. The operating temperature is within a range of about 250° C. and about 400° C.

Metal impregnated supported catalysts were prepared with a standard wet impregnation technique with corresponding metal containing salts as precursor followed by calcination at 1000° F. in air to obtain target weight loading. Table 1 provides observed NO conversions for different combinations of metals loaded onto different zeolites.

TABLE 1

| Catalyst Description | NO Reduction (%) |
| --- | --- |
| 6% Co 4% W on ZSM-5A | 99 |
| 6% V 4% W on ZSM-5A | 99 |
| 6% V 4% W on USY (Tosoh) | 99 |
| 6% V 4% W on Beta | 99 |
| 6% V 4% W on ZSM-57 | 95 |
| 6% V 4% W on USY (Zeolyst) | 93 |
| 6% V 4% W on MCM-41 | 93 |

In a second example, a gas mixture consisting of about 50 ppm of NO, about 2% $O_2$, and about 5% $H_2O$ is treated with a heterogeneous solid catalyst in a single stage SCR process with about 40 ppm, about 50 ppm, and about 60 ppm of $NH_3$ used as a reductant. The total flow rate is such that the GHSV ranged from 30K to 120K cc per hour. The operating temperature is within a range of about 250° C. and about 400° C. ZSM-5A was impregnated with about 6% V and about 4% W. As a control, Alumina and Titania were loaded with about 6% V and about 4% W. Table 2 provides observed NO conversions for the different catalysts at about 40 ppm $NH_3$, about 50 ppm $NH_3$, and about 60 ppm $NH_3$.

TABLE 2

| Catalyst Description | Amount of $NH_3$ (ppm) | NO Reduction (%) |
| --- | --- | --- |
| 6% V 4% W on ZSM-5A | 50 | 99 |
| 6% V 4% W on Alumnia | 50 | 77 |
| 6% V 4% W on Titania | 50 | 70 |
| 6% V 4% W on ZSM-5A | 60 | 98 |
| 6% V 4% W on Alumnia | 60 | 89 |
| 6% V 4% W on Titania | 60 | 77 |
| 6% V 4% W on ZSM-5A | 40 | 99 |
| 6% V 4% W on Alumnia | 40 | 59 |
| 6% V 4% W on Titania | 40 | 54 |

In summary, the methods, systems, and catalysts disclosed herein yield high NOx reduction relative to those known in the art.

The presently disclosed subject matter is not to be limited in scope by the specific embodiments described herein. Indeed, various modifications of the invention in addition to those described herein will become apparent to those skilled in the art from the foregoing description and the accompanying figures. Such modifications are intended to fall within the scope of the appended claims.

The invention claimed is:

1. A method for selective catalytic reduction of NOx comprising:
   providing an exhaust stream from a combustion operation, the exhaust stream containing an amount of NOx;
   introducing at least a portion of the exhaust stream and a reductant stream including ammonia to a catalytic reactor comprising a zeolite catalyst of at least one of ZSM-5, USY, ZSM-57, and MCM-41 loaded with at least two metals selected from the group consisting of tungsten, cobalt, and vanadium, the reductant stream and the at least a portion of the exhaust stream being introduced to the catalytic reactor at suitable operating conditions to reduce the amount of NOx in the exhaust stream; and directing the NOx-reduced exhaust stream from the catalytic reactor.

2. The method of claim 1, wherein the exhaust stream includes between about 0.1% and about 20% oxygen and between about 1% and about 10% water.

3. The method of claim 1, wherein providing the reductant stream comprises providing a molar ratio of ammonia to NOx between 0.5:1 and 1.5:1 in the catalytic reactor.

4. The method of claim 1, wherein providing the reductant stream comprises providing between 5 ppm and 2000 ppm of ammonia.

5. The method of claim 1, wherein introducing the reductant stream and the at least a portion of the exhaust stream collectively have a gaseous hourly space velocity of between 5K cc per hour and 120K cc per hour through the catalytic reactor.

6. The method of claim 1, wherein the operating temperature of the at least one catalytic reactor is between about 250° C. and about 400° C.

7. The method of claim 1, wherein the exhaust stream is provided from at least one refinery component selected from the group consisting of a combustion furnace, a boiler, a heater turbine, and a fluid catalytic cracking unit.

8. The method of claim 1, wherein the catalytic reactor is located relative a refinery flue of the at least one refinery component to maintain the catalytic reactor between 250° C. and 400° C.

9. The method of claim 1, wherein the operating temperature of the catalytic reactor is maintained between 250° C. and 400° C. by heating or cooling the exhaust stream.

10. The method of claim 1, wherein the zeolite catalyst comprises about 6 wt. % cobalt and about 4 wt. % tungsten loaded on ZSM-5.

11. The method of claim 1, wherein the zeolite catalyst comprises about 6 wt. % vanadium and about 4 wt. % tungsten loaded on ZSM-5.

12. The method of claim 1 wherein the zeolite catalyst comprises about 6 wt. % vanadium and about 4 wt. % tungsten loaded on USY.

13. The method of claim 1, wherein the zeolite catalyst comprises about 6 wt. % vanadium and about 4 wt. % tungsten loaded on Beta.

14. The method of claim 1, wherein the zeolite catalyst comprises about 6 wt. % vanadium and about 4 wt. % tungsten loaded on ZSM-57.

15. The method of claim 1, wherein the zeolite catalyst comprises about 6 wt. % vanadium and about 4 wt. % tungsten loaded on MCM-41.

16. The method of claim 1, wherein the amount of NOx is reduced by at least 90%.

17. A system for selective catalytic reduction of NOx comprising:
a conduit in fluid communication with a source of an exhaust stream from a combustion operation, the exhaust stream containing an amount of NOx;
a source of a reductant stream including ammonia;
a catalytic reactor in fluid communication with the conduit and the source of the reductant stream, the catalytic reactor comprising at one zeolite catalyst of at least one of ZSM-5, USY, ZSM-57, and MCM-41 loaded with at least two metals selected from the group consisting of tungsten, cobalt, and vanadium, and
configured to receive at least a portion of the exhaust stream and the reductant stream at suitable operating conditions to reduce the amount of NOx in the exhaust stream;
and an outlet in fluid communication with the catalytic reactor to direct the NOx reduced exhaust stream from the catalytic reactor.

18. The system of claim 17, wherein the zeolite catalyst comprises about 6 wt. % vanadium and about 4 wt. % tungsten loaded on ZSM-5.

19. The system of claim 17, wherein the zeolite catalyst comprises about 6 wt. % vanadium and about 4 wt. % tungsten loaded on USY.

20. The system of claim 17, wherein the zeolite catalyst comprises about 6 wt. % vanadium and about 4 wt. % tungsten loaded on Beta.

21. The system of claim 17, wherein the zeolite catalyst comprises about 6 wt. % vanadium and about 4 wt. % tungsten loaded on ZSM-57.

22. The system of claim 17, wherein the zeolite catalyst comprises about 6 wt. % vanadium and about 4 wt. % tungsten loaded on MCM-41.

23. A catalyst for use in selective catalytic reduction of NOx, wherein the catalyst is prepared according to the procedure comprising the steps of:
permeating into a catalytic molecular sieve comprising at least one of ZSM-5, USY, ZSM-57, and MCM-41 an amount of cobalt and tungsten to provide a metal-modified catalyst with a loading of cobalt and tungsten; and
calcining the metal-modified catalyst in air to obtain a predetermined weight loading of about 6 wt. % cobalt and about 4 wt. % tungsten in the metal-modified catalyst.

* * * * *